US011238867B2

(12) United States Patent
Sankoda

(10) Patent No.: US 11,238,867 B2
(45) Date of Patent: Feb. 1, 2022

(54) EDITING OF WORD BLOCKS GENERATED BY MORPHOLOGICAL ANALYSIS ON A CHARACTER STRING OBTAINED BY SPEECH RECOGNITION

(71) Applicant: FUJITSU LIMITED, Kawasaki (JP)

(72) Inventor: Satoru Sankoda, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 195 days.

(21) Appl. No.: 16/569,769

(22) Filed: Sep. 13, 2019

(65) Prior Publication Data

US 2020/0105270 A1 Apr. 2, 2020

(30) Foreign Application Priority Data

Sep. 28, 2018 (JP) .............................. JP2018-185697

(51) Int. Cl.
*G10L 15/26* (2006.01)
*G10L 15/05* (2013.01)
*G10L 15/08* (2006.01)

(52) U.S. Cl.
CPC .............. *G10L 15/26* (2013.01); *G10L 15/05* (2013.01); *G10L 2015/086* (2013.01); *G10L 2015/088* (2013.01)

(58) Field of Classification Search
CPC ......... G10L 15/22; G10L 15/26; G10L 15/05; G10L 2015/228; G10L 13/08; G10L 2015/223; G10L 15/02; G10L 15/063; G10L 15/18; G10L 15/30; G10L 2015/0635; G10L 2015/086; G10L 2015/088; G06F 3/167; G06F 40/166; G06F 40/171; G06F 40/232; G06F 40/247; G06F 40/253

USPC ........ 704/251, 235, 260, 270.1, 270, 258, 9, 704/257, 10, 275
See application file for complete search history.

(56) References Cited

U.S. PATENT DOCUMENTS

| | | | | |
|---|---|---|---|---|
| 6,138,098 A | * | 10/2000 | Shieber ................. | G06F 40/211 704/257 |
| 10,540,976 B2 | * | 1/2020 | Van Os .................... | G10L 15/26 |
| 2009/0306980 A1 | * | 12/2009 | Shin ...................... | G06F 3/0236 704/235 |
| 2010/0312547 A1 | * | 12/2010 | Van Os ................... | G06F 3/167 704/9 |

(Continued)

FOREIGN PATENT DOCUMENTS

| JP | H09-190436 A | 7/1997 |
|---|---|---|
| JP | 2009-217665 A | 9/2009 |
| JP | 2018-004947 A | 1/2018 |

OTHER PUBLICATIONS

JP2009217665A Machine Translation from IP.com, pp. 1-33, 2009. (Year: 2009).*

*Primary Examiner* — Vijay B Chawan
(74) *Attorney, Agent, or Firm* — Fujitsu Patent Center

(57) ABSTRACT

An apparatus displays, on a terminal that enables a touch operation, an edit screen on which a text including word blocks is edited, where the word blocks are generated by performing morphological analysis on a character string obtained by speech recognition. Upon reception of a scroll instruction to scroll the text, the apparatus shifts each of the word blocks displayed on the edit screen in a description direction of the text, based on the scroll instruction.

18 Claims, 10 Drawing Sheets

(56) References Cited

U.S. PATENT DOCUMENTS

| | | | |
|---|---|---|---|
| 2014/0088970 A1* | 3/2014 | Kang | G06F 3/167 |
| | | | 704/260 |
| 2016/0048318 A1* | 2/2016 | Markiewicz | G06F 3/041 |
| | | | 345/173 |
| 2017/0263248 A1* | 9/2017 | Gruber | G06F 40/166 |
| 2018/0018308 A1* | 1/2018 | Zuo | G06F 40/166 |
| 2019/0189125 A1* | 6/2019 | Van Os | G10L 15/26 |

* cited by examiner

EDITING OF WORD BLOCKS GENERATED BY MORPHOLOGICAL ANALYSIS ON A CHARACTER STRING OBTAINED BY SPEECH RECOGNITION

CROSS-REFERENCE TO RELATED APPLICATION

This application is based upon and claims the benefit of priority of the prior Japanese Patent Application No. 2018-185697, filed on Sep. 28, 2018, the entire contents of which are incorporated herein by reference.

FIELD

The embodiments discussed herein are related to editing of word blocks generated by morphological analysis on a character string obtained by speech recognition.

BACKGROUND

There is a technique of inputting a character string through speech recognition using a computer. The character string input by the speech recognition may need to be manually corrected when the character string includes a misrecognized character. Further, software of speech recognition generates word blocks by performing, morphological analysis of a character string obtained by speech recognition and uses a technique, such as kana-kanji conversion, to correct the word blocks.

Examples of related-art documents are Japanese Laid-open Patent Publication No. 2018-004947, Japanese Laid-open Patent Publication No. 9-190436, and Japanese Laid-open Patent Publication No. 2009-217665.

SUMMARY

According to an aspect of the embodiment, an apparatus displays, on a terminal that enables a touch operation, an edit screen on which a text including word blocks is edited, where the word blocks are generated by performing morphological analysis on a character string obtained by speech recognition. Upon reception of a scroll instruction to scroll the text, the apparatus shifts each of the word blocks displayed on the edit screen in a description direction of the text, based on the scroll instruction.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A smartphone, a tablet terminal, or the like may be used to perform correction work of a word block. However, a range of comfortable touch operation using the thumb or the like while holding the device (hereinafter, one-hand operation) is a limited range that may be reached by the finger in the smartphone, the tablet terminal, or the like. For example, in the one-hand operation using the right hand, the right side of the screen is the range of comfortable touch operation. Therefore, even when a scroll bar is used to vertically scroll the screen, a word block on the left side of the screen does not enter the range of comfortable touch operation, and the correction work may be difficult.

Furthermore, the correction work of a result of speech recognition is work according to the timing of the reproduction of speech corresponding to the word block to be checked and corrected, and it is important that a timely operation is possible.

It is desirable that the result of speech recognition may be efficiently corrected in the terminal in which the touch operation is performed.

An editing program, an editing method, and an editing apparatus according to embodiments will now be described with reference to the drawings.

The same reference signs are provided to the components with the same functions in the embodiments, and the description will not be repeated. The editing program, the editing method, and the editing apparatus described in the following embodiments are just examples, and the embodiments are not limited to these. The embodiments may be appropriately combined without being inconsistent with each other.

Figure 1:
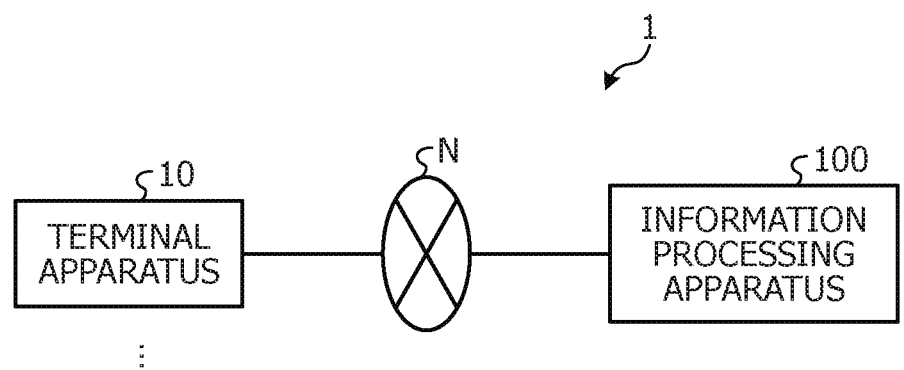
FIG. 1 is a block diagram illustrating an example of a configuration of an information processing system according to embodiments.

FIG. 1 is a block diagram illustrating an example of a configuration of an information processing system according to the embodiments. As illustrated in FIG. 1, an information processing system 1 includes a terminal apparatus 10 and an information processing apparatus 100. The number of terminal apparatuses 10 is not limited in the information processing system 1, and an arbitrary number of terminal apparatuses 10 may be included.

The terminal apparatus 10 and the information processing apparatus 100 are coupled to and capable of communicating with each other through a network N, The network N may be an arbitrary type of wired or wireless communication network, such as the Internet, a local area network (LAN), and a virtual private network (VPN). The communication through the network N may be encrypted by, for example, transport layer security (TLS)/secure sockets layer (SSL).

The information processing system 1 is an example of a system that transmits material and speech data from the terminal apparatus 10 to the information processing apparatus 100 and that edits text data generated by speech recognition using an edit screen provided by the information processing apparatus 100.

The terminal apparatus 10 is an information processing apparatus used by a user who edits text data generated by speech recognition of speech data. The terminal apparatus 10 may be, for example, a smartphone or a tablet terminal. This allows the user to execute a one-hand operation of the terminal apparatus 10 to perform editing work of the text data.

The terminal apparatus 10 transmits, for example, the material and the speech data of a meeting as a target of generating minutes to the image processing apparatus 100 through the network N. The terminal apparatus 10 uses the edit screen provided by the information processing apparatus 100 to receive an edit of text data generated by speech recognition and reproduces the speech of a section including the edit part. In this case, the terminal apparatus 10 sequentially transmits and receives, to and from the information processing apparatus 100, the edit information and the speech data of the section including the edit part. The terminal apparatus 10 also transmits a start instruction to the information processing apparatus 100 when the terminal apparatus 10 starts to edit the text data.

The information processing apparatus 100 is an information processing apparatus that provides an edit screen for receiving an edit of text data generated by speech recognition of speech data received from the terminal apparatus 10 and is an example of the editing apparatus. The information processing apparatus 100 generates an edit screen of a text including word blocks generated, from a character string obtained by speech recognition, by using morphological analysis and provides the edit screen to the terminal apparatus 10. The word block is a character string generated by using morphological analysis. The word block may coincide with a morpheme or may be a combination of a plurality of morphemes. The terminal apparatus 10 displays the edit screen generated by the information processing apparatus 100. The terminal apparatus 10 receives an operation instruction in the edit screen and notifies the information processing apparatus 100 of the operation instruction. Examples of the operation instruction in the edit screen include a correction instruction for correcting content of a given word block and a scroll instruction for scrolling the text including the word blocks.

When the information processing apparatus 100 receives the scroll instruction for scrolling the text, the information processing apparatus 100 shifts the word blocks displayed on the edit screen in a description direction of the text based on the scroll instruction. In this way, when, for example, the right hand is used to perform the one-hand operation of the terminal apparatus 10, a given word block may be shifted to the right side or the like of the screen that allows a comfortable touch operation. The information processing apparatus 100 also corrects the content of the given word block based on the received correction instruction.

Although the information processing apparatus 100 provides the terminal apparatus 10 with the edit screen for receiving the edit of the text data generated by the speech recognition in the configuration illustrated in the present embodiments, it is obvious that a single apparatus, such as the terminal apparatus 10, may realize the embodiments.

Figure 2:
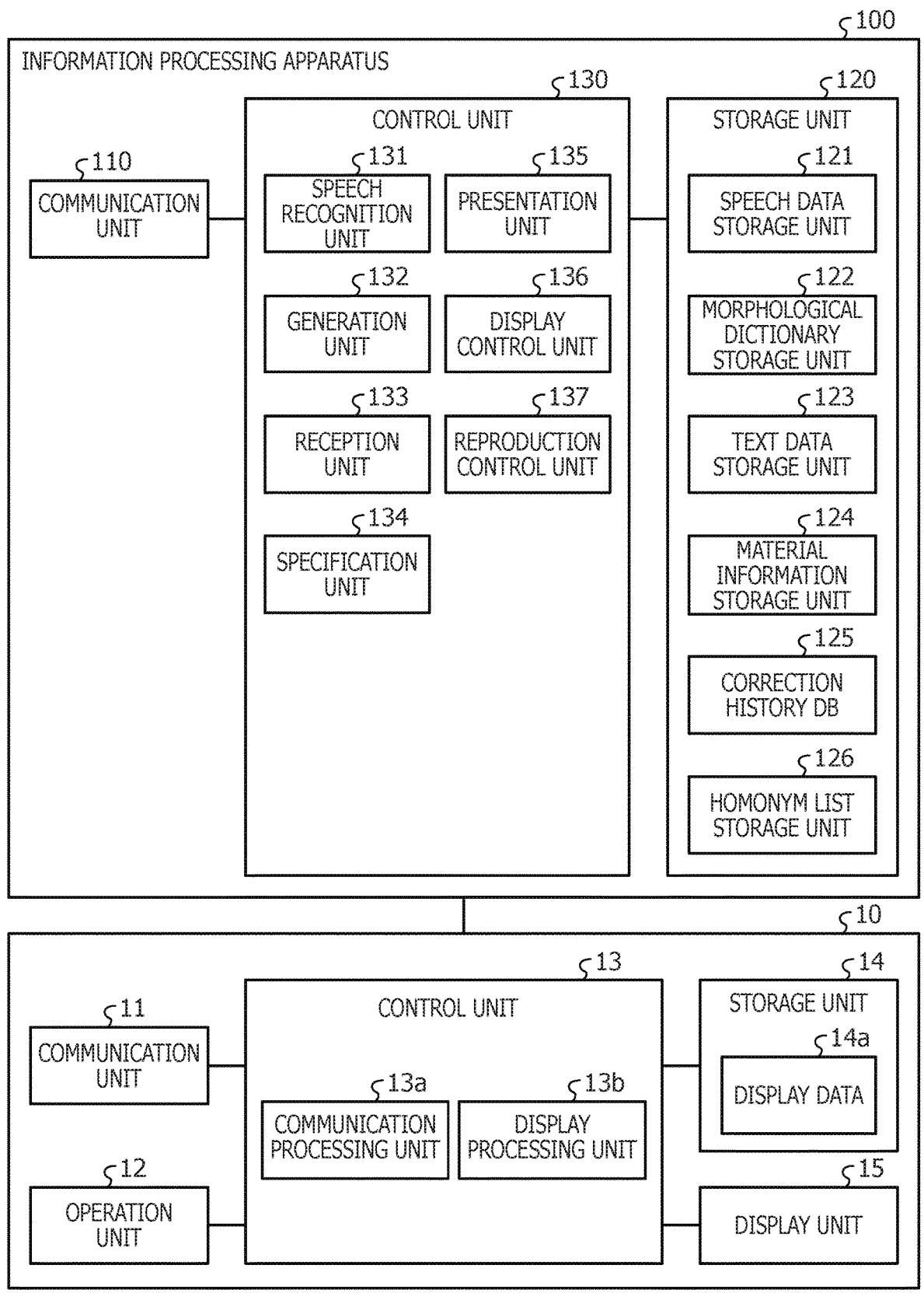
FIG. 2 is a block diagram illustrating an example of a functional configuration of an information processing system according to the embodiments.

Next, a functional configuration of the information processing system 1 will be described. FIG. 2 is a block diagram illustrating an example of a functional configuration of the information processing system 1 according to the embodiments.

As illustrated in FIG. 2, the information processing apparatus 100 includes a communication unit 110, a storage unit 120, and a control unit 130. The terminal apparatus 10 includes a communication unit 11, an operation unit 12, a control unit 13, a storage unit 14, and a display unit 15. The information processing apparatus 100 and the terminal apparatus 10 may also include various functional units included in a known computer, such as various input devices and speech output devices, in addition to the functional units illustrated in FIG. 2.

The communication unit 110 is realized by, for example, a network interface card (NIC). The communication unit 110 is a communication interface that is coupled to the terminal apparatus 10 using wired or wireless coupling through the network N and that manages communication of information to and from the terminal apparatus 10. The communication unit 110 receives the material and the speech data of the meeting and the edit information from the terminal apparatus 10. The communication unit 110 outputs the received material and speech data of the meeting and the received edit information to the control unit 130. The communication unit 110 also transmits, to the terminal apparatus 10, display data 14a regarding the edit screen or the like and speech data of the section including the edit part input from the control unit 130.

The storage unit 120 is realized by, for example, a semiconductor memory device, such as a random access memory (RAM) and a flash memory, or a storage apparatus, such as a hard disk and an optical disk. The storage unit 120 includes a speech data storage unit 121, a morphological dictionary storage unit 122, a text data storage unit 123, a material information storage unit 124, a correction history database (hereinafter, referred to as DB) 125, and a homonym list storage unit 126. The storage unit 120 stores information used in the process of the control unit 130.

The speech data storage unit 121 stores the speech data received from the terminal apparatus 10. The speech data is, for example, speech data recorded by an Integrated Circuit (IC) recorder and compressed by using various codecs, such as MPEG-1 Audio Layer-3 (MP3) and advanced audio coding (AAC). The speech data storage unit 121 may also store moving image data including, in a container of MP4 or the like, moving images of H.264/MPEG-4 advanced video coding (AVC) or the like and speech.

The morphological dictionary storage unit 122 stores a morphological dictionary used for morphological analysis of a character string obtained by speech recognition. General terms are stored in advance in the morphological dictionary. Examples of the general terms include words, such as " 'コンピュータ' " (computer) and " 技術 " (technology).

The text data storage unit 123 stores text data including a plurality of word blocks generated by morphological analysis of the character string obtained by speech recognition. When a plurality of speech recognition engines are used to perform the speech recognition, the text data storage unit 123 stores text data corresponding to each speech recognition engine. The text data storage unit 123 is updated based on selection of a correction candidate of a word block selected by the user or details of correction input for a word block.

The material information storage unit 124 stores the material and the like of the meeting received from the terminal apparatus 10. The material of the meeting is, for example, a distributed document in the meeting or material displayed by using a projector or the like. The material includes, for example, a text that may estimate the details of speech in the meeting. The material information storage unit 124 also stores a word list including sound (phonemes) of words extracted from the material.

The correction history DB 125 stores the details of the correction of the text data in the past. The correction history DB 125 associates and stores, for example, the characters and the phonemes of the word blocks before the correction and after the correction. The material information storage unit 124 and the correction history DB 125 are examples of a dynamic dictionary in which the content changes according to the correction.

The homonym list storage unit 126 stores a list of homonyms. The homonym list storage unit 126 stores, for example, a plurality of words as homonyms, such as "●●" (move) "●●" (transfer), and "●●" (difference), in association with sound of "いどう" (Japanese pronunciation "idou").

A central processing unit (CPU), an micro processing unit (MPU), or the like uses the RAM as a work area and executes a program stored in an internal storage apparatus to realize the control unit 130. The control unit 130 may also be realized by an integrated circuit, such as an application specific integrated circuit (ASIC) and a field programmable gate array (FPGA).

The control unit 130 includes a speech recognition unit 131, a generation unit 132, a reception unit 133, a specification unit 134, a presentation unit 135, a display control unit 136, and a reproduction control unit 137 and realizes or executes functions and actions of information processing described below. The internal configuration of the control unit 130 is not limited to the configuration illustrated in FIG. 2, and the control unit 130 may include a different configuration for executing the information processing described later.

The speech recognition unit 131 performs speech recognition of the speech data stored in the speech data storage unit 121 to generate character string data. The speech recognition unit 131 includes a plurality of speech recognition engines and generates character string data corresponding to each engine. Examples of the speech recognition engines include various speech recognition engines, such as AmiVoice (registered trademark) engines. The speech recognition unit 131 may also use, as the speech recognition engine, a server or the like that provides a speech recognition API (Application Programming Interface) through the communication unit 110 and the network N. The character string data includes, for example, start time, end time, sound, and recognition result (including kanji, katakana, or the like) of each word (character string) obtained by speech recognition. The speech recognition unit 131 outputs the generated character string data to the generation unit 132.

Once the character string data is input from the speech recognition unit 131, the generation unit 132 refers to the morphological dictionary storage unit 122 and performs morphological analysis of the character string data to generate text data divided into a plurality of word blocks. The text data includes the start time, the end time, the sound, and the recognition result (including kanji, katakana, or the like) of each word block based on the character string data. The generation unit 132 stores the generated text data in the text data storage unit 123.

The reception unit 133 receives various instructions, such as start of edit, scroll operation in edit screen, and input operation for inputting, selecting, or deciding details of edit, from the terminal apparatus 10 through the network N and the communication unit 110. Once the reception unit 133 receives various instructions from the terminal apparatus 10, the reception unit 133 outputs the received instructions to the specification unit 134.

For example, the reception unit 133 receives a scroll instruction through operation of the scroll bar or the like in the edit screen. The reception unit 133 also receives a correction instruction of each of a plurality of word blocks in the edit screen. For example, the reception unit 133 receives selection of a correction candidate when correction candidates corresponding to a given word block are displayed on the edit screen. The reception unit 133 may also receive correction of a character from the user when the correction candidates are displayed.

The specification unit 134 specifies the details of various instructions received by the reception unit 133. For example, the specification unit 134 specifies a start instruction for starting the edit and outputs the specified start instruction to the display control unit 136. The specification unit 134 also specifies a scroll instruction through operation of the scroll bar and outputs the specified scroll instruction to the display control unit 136.

The specification unit 134 also specifies the correction instruction of each of the plurality of word blocks. The specification unit 134 updates the text data of the text data storage unit 123 based on the received correction candidates or details of corrections.

For example, the specification unit 134 specifies the word block to be corrected based on the correction instruction. For example, the specification unit 134 specifies a word block at a given position (such as upper right or upper left) on the edit screen as a word block to be corrected. The specification unit 134 may also specify a word block subjected to a selection operation or the like as the word block to be corrected.

The specification unit 134 then outputs the specified word block to be corrected to the presentation unit 135 and the display control unit 136. As a result, the correction candidates corresponding to the word block to be corrected are displayed on the edit screen. The specification unit 134 then specifies the details of the selection of the correction candidate and the details of the correction of the character from the user and updates the text data of the text data storage unit 123 based on the specified details.

The specification unit 134 also outputs the input speech to the speech recognition unit 131 and acquires the result of speech recognition when the details of the correction of the character from the user are input by speech. In this way, the specification unit 134 may specify the correction instruction regarding the word block to be corrected based on the input speech when the reception unit 133 receives the speech input.

Once the specification unit 134 updates the text data, the specification unit 134 determines whether or not the word block to be corrected is the last word block of the text data. The specification unit 134 continues to receive various instructions to perform the editing work on the edit screen when the specification unit 134 determines that the word block is not the last word block. The specification unit 134 notifies the display control unit 136 of the end of the edit when the specification unit 134 determines that the word block is the last word block. The display control unit 136 that has received the notification of the end of the edit displays, on the edit screen, the end of the edit of the text data being edited and ends the process.

Once the word block to be corrected is input from the specification unit 134, the presentation unit 135 generates correction candidates of the word block from sources. In this case, the presentation unit 135 refers to the text data storage unit 123, the material information storage unit 124, the correction history DB 125, and the homonym list storage unit 126 as sources. The word block to be corrected may be a series of word blocks including word blocks before and after the word block set in advance as a correction target.

In generating the correction candidates, the presentation unit 135 sets, for example, words with close phonemes (sound) as the correction candidates based on the material of the meeting and the word list stored in the material information storage unit 124. In generating the correction candidates, the presentation unit 135 also sets, for example, at least one of a word with a matching character and a word with a matching phoneme as the correction candidate based on the details of the correction of the text data in the past stored in the correction history DB 125. In generating the correction candidates, the presentation unit 135 also sets, for example, words corresponding to the word block to be corrected as the correction candidates based on the text data recognized by second and third speech recognition engines stored in the text data storage unit 123. In generating the correction candidates, the presentation unit 135 also sets, for example, homonymous words as the correction candidates based on the list of homonyms stored in the homonym list storage unit 126.

The presentation unit 135 decides a display order of the plurality of generated correction candidates to present the correction candidates in order of, for example, closeness of the character string corresponding to the sound (phoneme). The presentation unit 135 may also decide the display order of the plurality of generated correction candidates to present the correction candidates in order of, for example, rank in statistics, such as in order of the possibility of correctness. When, for example, correction candidates generated from a plurality of sources among the plurality of generated correction candidates overlap, the presentation unit 135 may determine that the correction candidates include a high possibility of correctness. The presentation unit 135 may display the correction candidates higher or may color the correction candidates according to the importance. The presentation unit 135 outputs the plurality of generated correction candidates and the decided display order to the display control unit 136.

Once the start instruction of the edit is input from the reception unit 133, the display control unit 136 reads the text data storage unit 123 to generate an edit screen of the text data including an edit area of a given number of word blocks to be edited arranged in the description order of the text. The display control unit 136 transmits the generated edit screen as the display data 14a to the terminal apparatus 10 through the communication unit 110 and the network N. The display control unit 136 starts to reproduce the speech and display the word blocks on the edit screen. In this case, the display control unit 136 sets a speech reproduction section corresponding to from the top to the bottom of the word blocks included in the edit area of the given number of word blocks arranged in the description order of the text. The display control unit 136 then outputs the set speech reproduction section to the reproduction control unit 137.

The display control unit 136 may also display a range wider than word blocks displayed in the edit area, such as a character string included in a range temporally before and after the word blocks, in an area different from the edit area (previous display area and subsequent display area) on the edit screen.

Once the scroll instruction is input from the specification unit 134 through the operation of the scroll bar or the like on the edit screen, the display control unit 136 shifts the respective word blocks displayed on the edit screen in the description direction of the text based on the scroll instruction.

For example, the display control unit 136 shifts each word block in a forward direction of the description direction of the text in a case of a scroll instruction for advancing in the forward direction of the description direction of the text through a forward operation of the scroll bar. The display control unit 136 shifts each word block in a rewinding direction of the description direction of the text in a case of a scroll instruction for returning in the opposite direction of the description direction of the text through a back operation of the scroll bar. The display control unit 136 then updates the speech reproduction section based on the respective word blocks included in the shifted edit area and outputs the updated speech reproduction section to the reproduction control unit 137. For example, the display control unit 136 instructs the reproduction control unit 137 to reproduce the speech of the text section in the edit area.

Once the plurality of correction candidates and the display order are input from the presentation unit 135, the display control unit 136 displays the plurality of correction candidates according to the display order on the edit screen, such as around the word block to be corrected. In this case, the display control unit 136 displays the correction candidates at positions avoiding the description direction of the text around the word block to be corrected.

The display control unit 136 may determine the positions of the correction candidates to be arranged around the word block based on the number of characters of the correction candidates. For example, the display control unit 136 sets the arrangement position above or below the word block or in a direction farther than the edge of the edit screen when the number of characters of the correction candidate is equal to or greater than a given number and a long width is required for the display. The display control unit 136 sets the arrangement position in a direction closer to the edge of the edit screen with respect to the word block when the number of characters of the correction candidates is equal to or smaller than a given number and a short width is required for the display.

The display control unit 136 changes at least one of the display color and the density of the color of the correction candidate according to the possibility of correctness and the source of the correction candidate. The display control unit 136 also sets a common display mode, such as the same display color, for the correction candidates generated from the same source.

In presenting the correction candidates, the display control unit 136 displays, for example, lines at boundaries of word blocks before and after the word blocks to be corrected to allow discriminating which correction candidates correspond to which word blocks. In this case, the display control unit 136 draws, for example, frames surrounding the correction candidates to the boundary lines of the corresponding word blocks.

Once the speech reproduction selection is input from the display control unit 136, the reproduction control unit 137 refers to the speech data storage unit 121 to transmit the speech data of the speech reproduction section, which corresponds to the text section in the edit area, to the terminal apparatus 10 through the communication unit 110 and the network N. In this case, the reproduction control unit 137 controls the reproduction so as to repeatedly reproduce the speech data of the text section (section including the edit part) in the edit area. The reproduction control unit 137 may receive designated sections at sections corresponding to the previous display area and the subsequent display area of the edit screen and transmit the speech data of the received designated sections to the terminal apparatus 10 through the communication unit 110 and the network N. When a new text section is input during the reproduction of a text section, the reproduction control unit 137 reproduces the speech data up to the end of the text section being reproduced and then controls the reproduction so as to reproduce the speech from the start of the new text section.

Similar to the communication unit 110, the communication unit 11 is a communication interface that is coupled to the information processing apparatus 100 by wireless coupling or the like through the network N and that manages the communication of information to and from the information processing apparatus 100. For example, the communication unit 11 transmits the material and the speech data of the meeting and the edit information to the information processing apparatus 100. The communication unit 11 receives the display data 14a regarding the edit screen or the like and the speech data of the section including the edit part from the information processing apparatus 100.

The operation unit 12 is an input device or the like that receives various operations by the user of the terminal apparatus 10, and the operation unit 12 notifies the control unit 13 of the received various operations. For example, the operation unit 12 is a touch panel placed over the display unit 15, and the operation unit 12 receives the touch operation of the user.

The control unit 13 includes a communication processing unit 13a and a display processing unit 13b and controls various actions of the terminal apparatus 10. The communication processing unit 13a controls a communication process of the communication unit 11. For example, the communication processing unit 13a transmits the material and the speech data of the meeting and the edit information to the information processing apparatus 100 through the communication unit 11. The communication processing unit 13a also stores, in the storage unit 14, the display data 14a regarding the edit screen or the like and the speech data of the section including the edit part received from the information processing apparatus 100 through the communication unit 11.

The display processing unit 13b controls a display process of the display unit 15. For example, the display processing unit 13b reads the display data 14a stored in the storage unit 14 and displays the display data 14a on the display unit 15. As a result, the edit screen is displayed on the display unit 15 in the terminal apparatus 10. The display processing unit 13b also reads the speech data stored in the storage unit 14 and reproduces the speech through a speech output apparatus such as a speaker (not illustrated). As a result, the speech of the text section is reproduced in the terminal apparatus 10. The display processing unit 13b also sets, as edit information, various operations received from the operation unit 12 on the edit screen and notifies the information processing apparatus 100 of the edit information through the communication unit 11.

The storage unit 14 is a storage apparatus in the terminal apparatus 10, and the storage unit 14 stores various types of information, such as the display data 14a, the speech data, and the material of the meeting. The storage unit 14 may be, for example, a semiconductor memory device such as a flash memory. The display unit 15 is a display apparatus in the terminal apparatus 10, and the display unit 15 may be, for example, a liquid crystal display (LCD).

Figure 3:
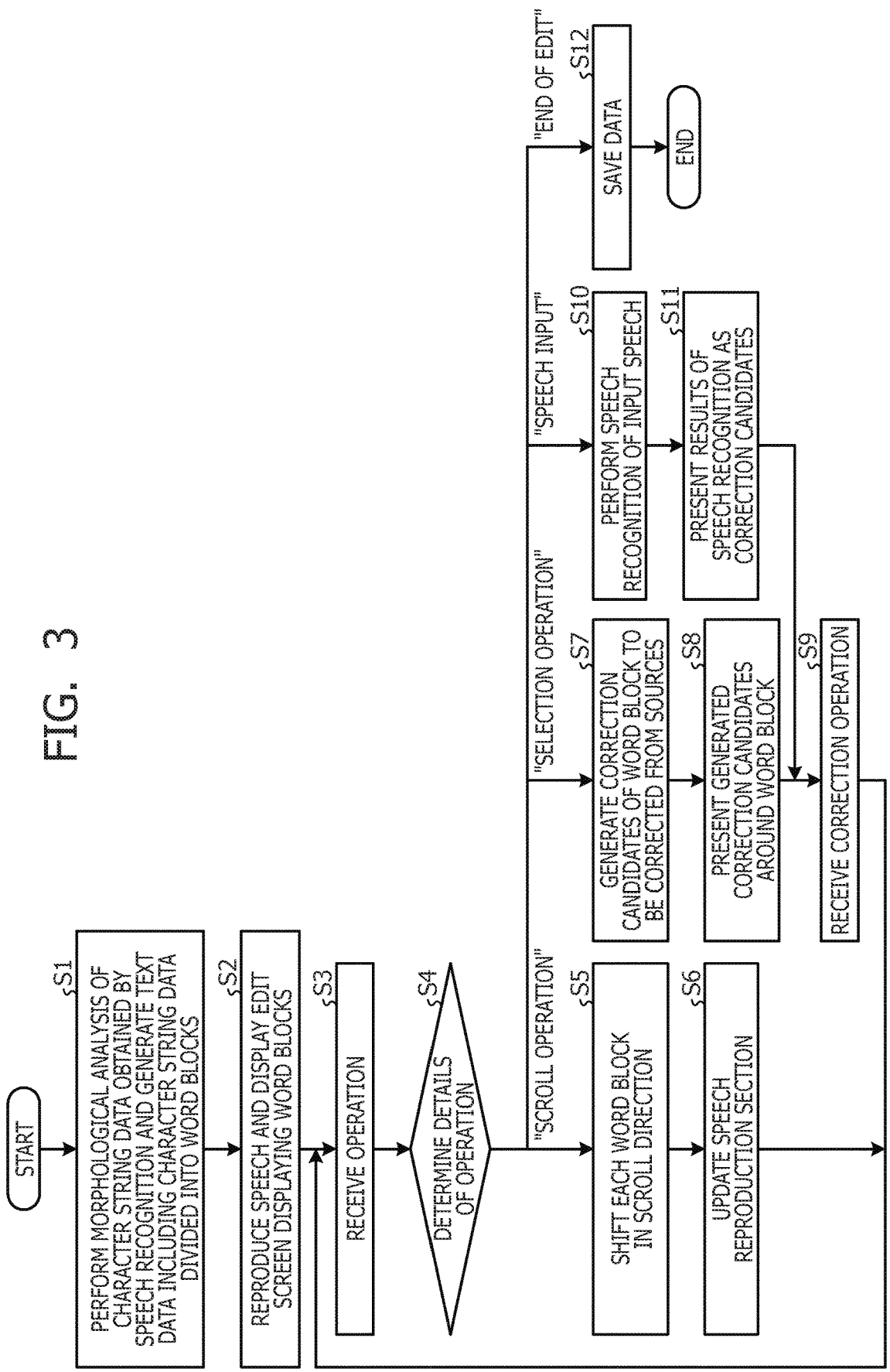
FIG. 3 is a flow chart illustrating an example of an action of an information processing apparatus.

Next, the operations of the information processing apparatus 100 regarding the edit screen will be described in detail. FIG. 3 is a flow chart illustrating an example of the operations of the information processing apparatus 100.

As illustrated in FIG. 3, once the process is started, the speech recognition unit 131 performs speech recognition of the speech data stored in the speech data storage unit 121 and generates character string data. The speech recognition unit 131 outputs the generated character string data to the generation unit 132. The generation unit 132 refers to the morphological dictionary storage unit 122 and performs morphological analysis of the character string data input from the speech recognition unit 131 to generate text data including the character string data divided into word blocks (S1). The generation unit 132 stores the generated text data in the text data storage unit 123.

Once the specification unit 134 specifies a start instruction from the terminal apparatus 10, the specification unit 134 outputs an instruction for generating the edit screen of the text data to the display control unit 136. Once the generation instruction of the edit screen is input from the reception unit 133, the display control unit 136 generates the edit screen of the text data. The display control unit 136 transmits the generated edit screen as the display data 14a to the terminal apparatus 10 and causes the terminal apparatus 10 to display the edit screen. The display control unit 136 starts to reproduce the speech and display the edit area on the edit screen (S2).

Figure 4:
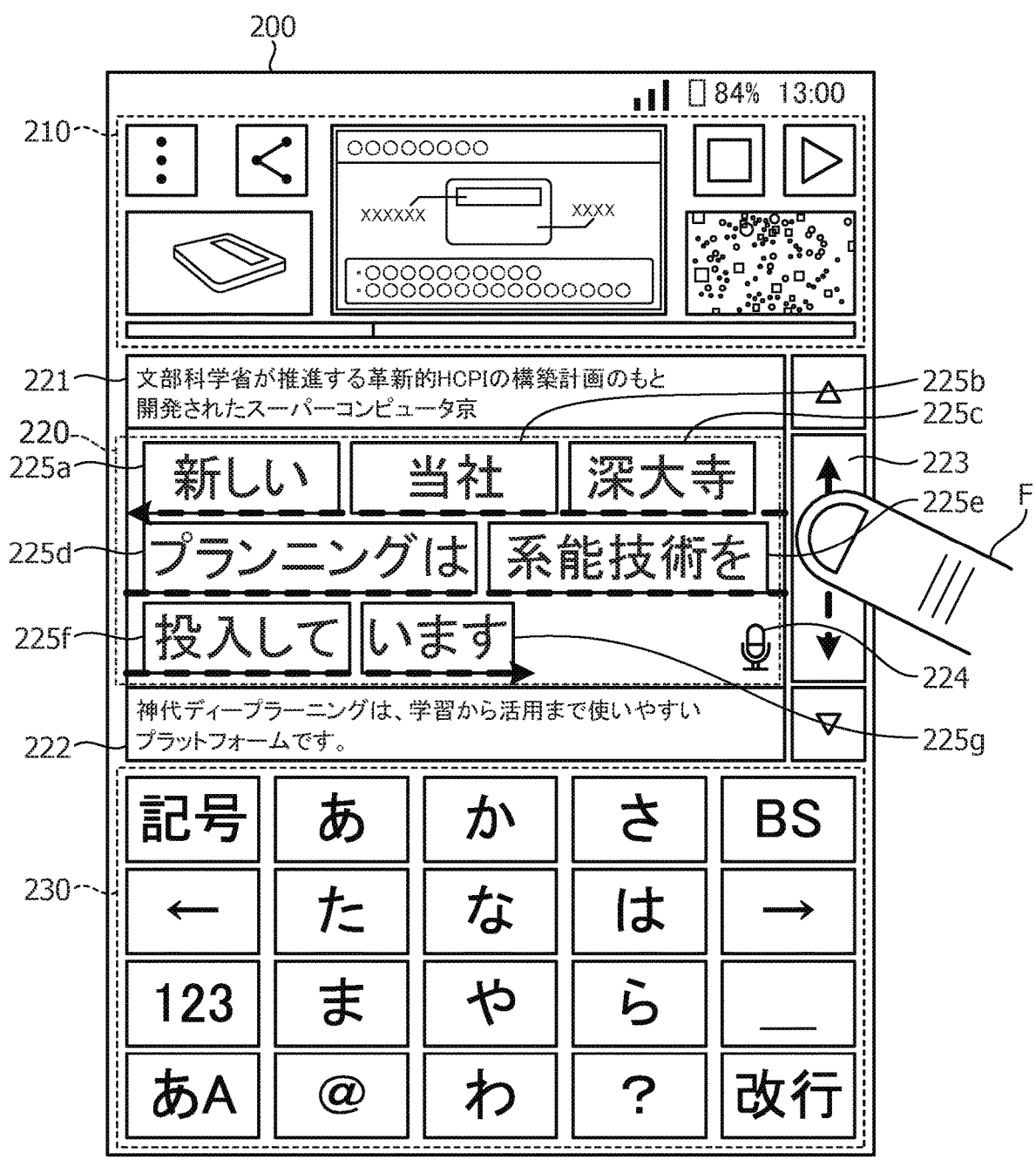
FIG. 4 is an explanatory diagram illustrating an example of an edit screen.

FIG. 4 is an explanatory diagram illustrating an example of an edit screen. As illustrated in FIG. 4, an edit screen 200 includes an image display area 210, an edit area 220, a previous display area 221, a subsequent display area 222, a scroll bar 223, a speech input instruction button 224, and a key input area 230. The image display area 210 is an area for displaying speech data, image data, and the like regarding the reproduction of the speech.

The edit area 220 is an area for arranging and displaying, in the description order of the text, a given number of word blocks 225a to 225g to be edited. For example, the word blocks 225a to 225g are arranged and displayed in the description direction of the text indicated by a dotted arrow (horizontally and to the right) in the edit area 220. In the following description, word blocks 225a to 225g will be referred to as word blocks 225 when the word blocks are not to be distinguished. For example, selection of a word block 225 to be corrected is received in the edit area 220 through a selection operation of touching a given word block 225.

In the edit area 220, the word block 225 to be corrected is not limited to a word block for which the selection operation is performed. For example, the right side of the screen is the range of comfortable touch operation in the one-hand operation using the right hand, Therefore, the word block 225c displayed at a given position (for example, upper right) in the edit area 220 may be the correction target. Conversely, the left side of the screen is the range of comfortable touch operation in the one-hand operation using the left hand. Therefore, the word block 225a displayed at a given position (for example, upper left) in the edit area 220 may be the correction target.

Although the description direction is the horizontal direction in the case illustrated in the present embodiment, it is obvious that the description direction may be the vertical direction. Although the display is presented in Japanese in the example of the present embodiment, the language is not limited to Japanese. The description direction may be the opposite direction (horizontal and to the left) depending on the language.

The previous display area 221 is an area for displaying the text before the edit area 220. The subsequent display area 222 is an area for displaying the text after the edit area 220. The scroll bar 223 is an area for receiving a scroll instruction through a touch operation using a finger F or the like. For example, an upward operation is received as a back operation, and a downward operation is received as a forward operation in the scroll bar 223.

The speech input instruction button 224 is an operation button for receiving speech input using a microphone (not illustrated) or the like. For example, the terminal apparatus 10 receives an operation of the speech input instruction button 224 to start the speech input from the microphone.

The key input area 230 is an area for displaying various input keys. The key input area 230 receives input of a character or the like through a touch operation of an input key using the finger F or the like.

Returning to FIG. 3, the reception unit 133 receives an operation instruction in the terminal apparatus 10 after S2 (S3). The specification unit 134 then specifies the operation instruction received by the reception unit 133 and determines the details of the operation (S4). For example, the specification unit 134 determines whether the instruction is a "scroll operation" of the scroll bar 223, a "selection operation" for selecting the word block 225, "speech input" through operation of the speech input instruction button 224, or "end of edit" for instructing that the edit is finished.

In the case of the "scroll operation" in S4, the specification unit 134 outputs a scroll instruction of the scroll bar 223 to the display control unit 136. The display control unit 136 then shifts each of the word blocks 225 displayed on the edit screen 200 in the description direction of the text based on the scroll instruction. The display control unit 136 updates the speech reproduction section based on each of the word blocks 225 included in the edit area 220 after the shift (S6) and outputs the updated speech reproduction section to the reproduction control unit 137.

Figure 5:
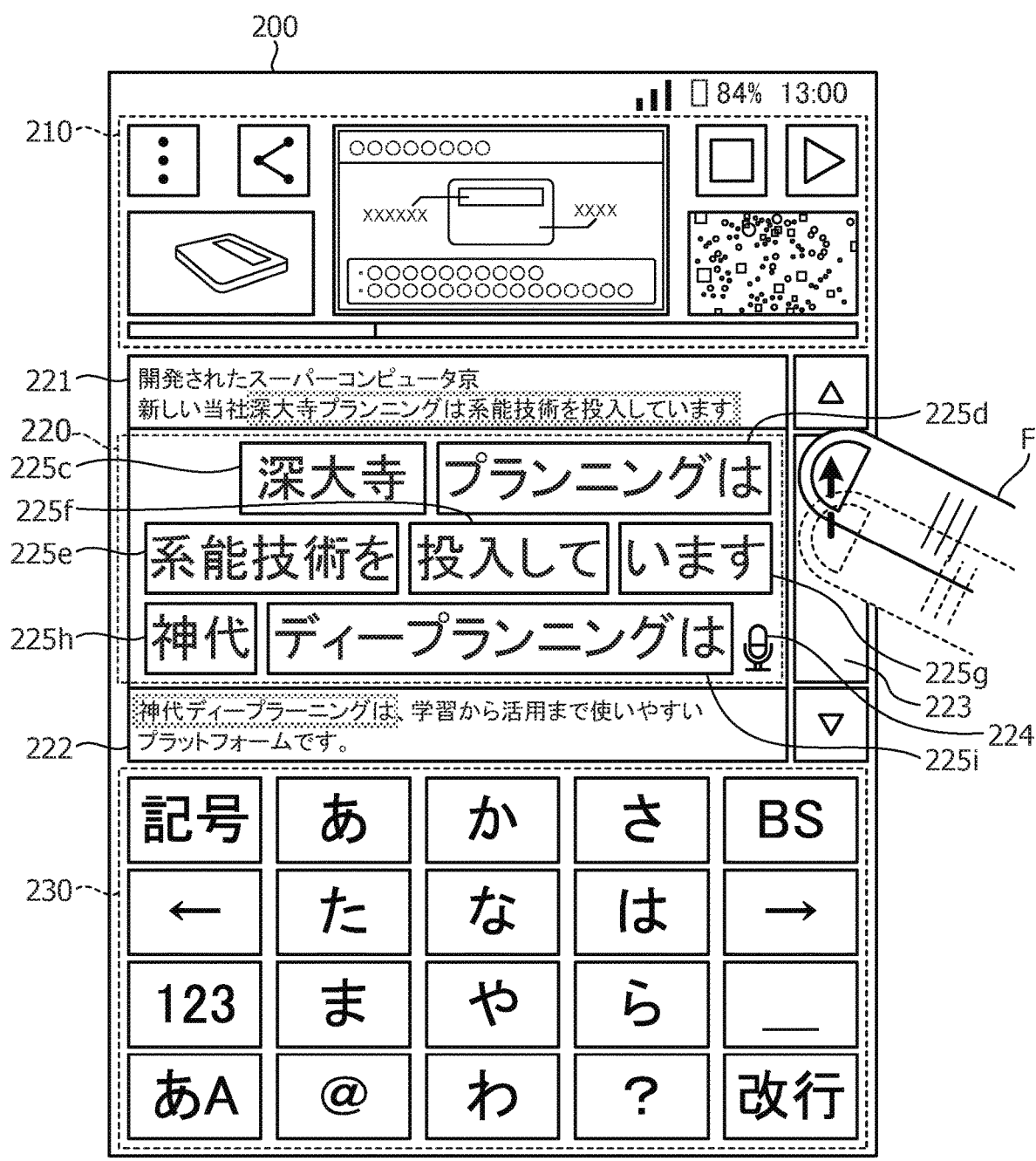
FIG. 5 is an explanatory diagram illustrating an example of an edit screen.

FIG. 5 is an explanatory diagram illustrating an example of an edit screen 200. For example, FIG. 5 illustrates a state after the shift following an upward back operation of the scroll bar 223 in the edit screen 200 of FIG. 4. As illustrated in FIG. 5, each of the word blocks 225 is rewound in the description direction of the text, and word blocks 225c to 225i are displayed on the edit screen 200 after the shift through the scroll instruction (back operation). For example, the word block 225d at the left end of the edit area 220 in FIG. 4 is displayed on the upper right of the screen. As a result, for example, since the right side of the screen is a range of comfortable touch operation in the one-hand operation using the right hand, an operation regarding the word block 225d may be easily performed.

In the case of "selection operation" in S4, the presentation unit 135 generates correction candidates of the word block 225 to be corrected from sources (S7). The display control unit 136 then displays and presents the correction candidates generated by the presentation unit 135 around the word block 225 to be corrected (S8).

Figure 6:
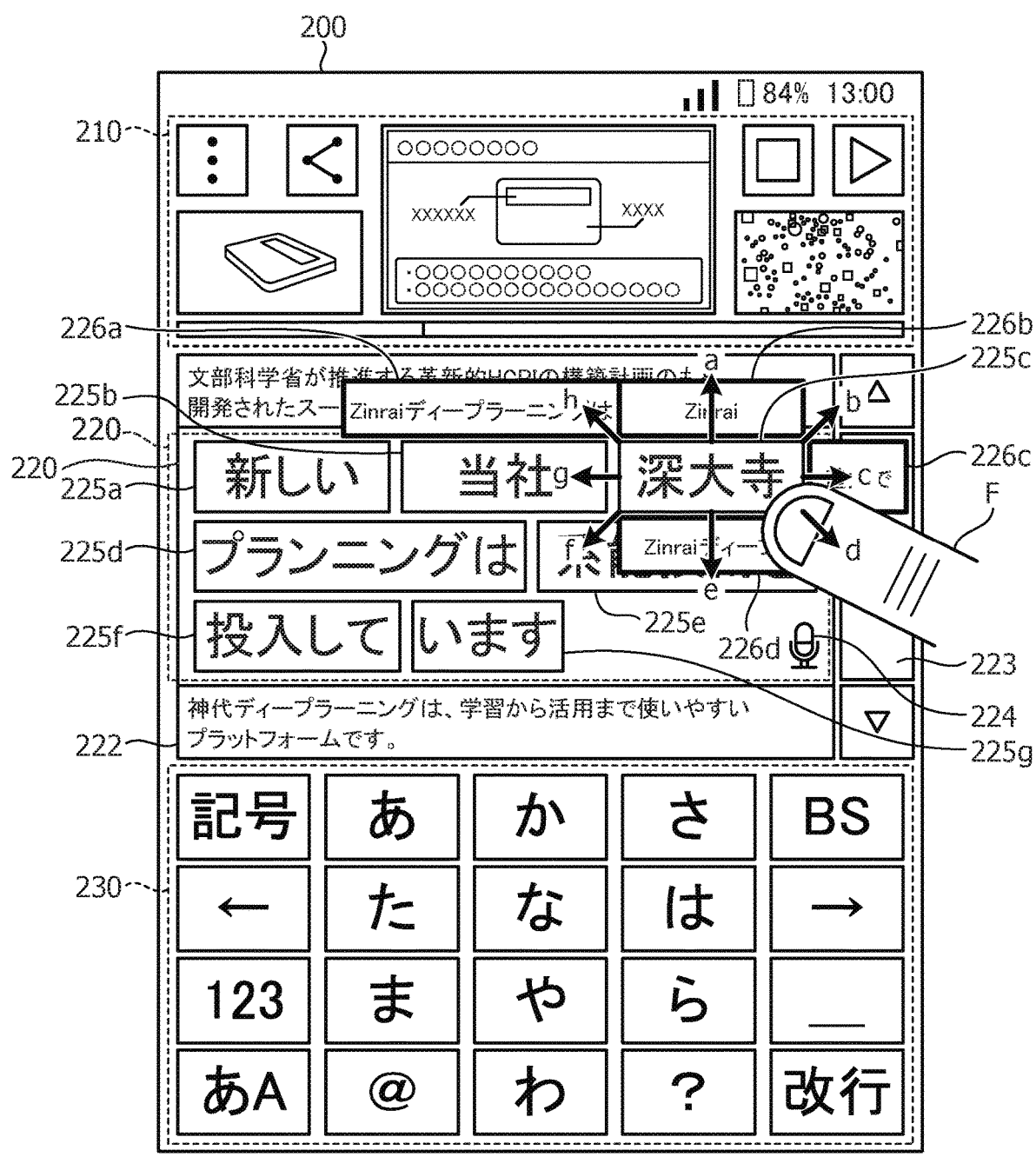
FIG. 6 is an explanatory diagram illustrating an example of an edit screen.

FIG. 6 is an explanatory diagram illustrating an example of the edit screen 200, and for example, is a diagram illustrating display of the correction candidates when the word block 225c is to be corrected. As illustrated in FIG. 6, the display control unit 136 displays correction candidates 226a to 226c around the word block 225c to be corrected at the upper right corner of the edit area 220. In the following description, correction candidates 226a to 226d will be referred to as correction candidates 226 when the correction candidates are not to be distinguished.

Here, the display control unit 136 displays the correction candidates 226 around (directions a to h) the word block 225c to be corrected at positions avoiding the description direction (direction g) of the text. Further, since the word block 225c is at the right end, the direction c is excluded from the description direction of the text. As a result, the word block 225b before the word block 225c in the description direction may be easily checked without being hidden by the correction candidates 226.

The display control unit 136 also determines the position of the correction candidate 226 arranged around the word block 225 based on the number of characters of the correction candidate 226. For example, the display control unit 136 arranges the correction candidate 226c, in which the number of characters is equal to or smaller than a given number and a short width is required for the display, closer to the edge of the edit screen 200 with respect to the word block 225c. The display control unit 136 arranges the correction candidates 226a, 226b, and 226d, in which the number of characters is equal to or greater than a given number and a long width is required for the display, above and below (directions a, e, and h) the word block 225c. As a result, the display control unit 136 may display each of the correction candidates 226 within the edit screen 200.

The reception unit 133 then receives a correction operation on the edit screen 200 (S9). The specification unit 134 specifies the correction operation received by the reception unit 133 and updates the text data of the text data storage unit 123 based on the specified details.

In the case of "speech input" in S4, the specification unit 134 performs speech recognition of the input speech using the speech recognition unit 131 (S10). The display control unit 136 then displays and presents the results of the speech recognition as the correction candidates 226 around the word block 225 (S11) and advances the process to S9.

In the case of "end of edit" in S4, the display control unit 136 displays the end of the edit of the text data being edited on the edit screen 200. The control unit 130 then saves the data of the content of the text data storage unit 123 as an edit result in a file or the like (S12) and ends the process.

Figure 8:
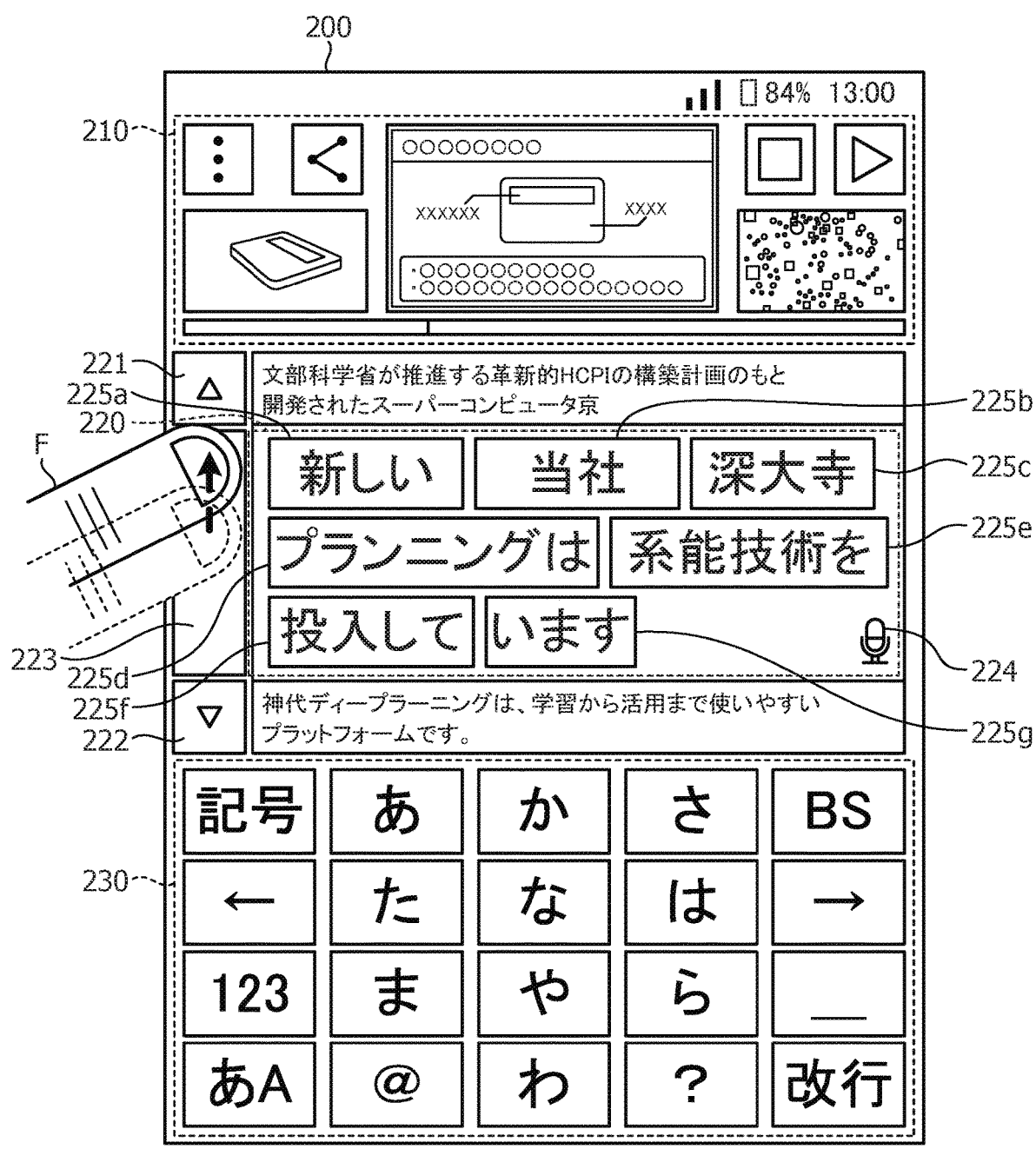
FIG. 8 is an explanatory diagram illustrating an example of an edit screen.
Figure 9:
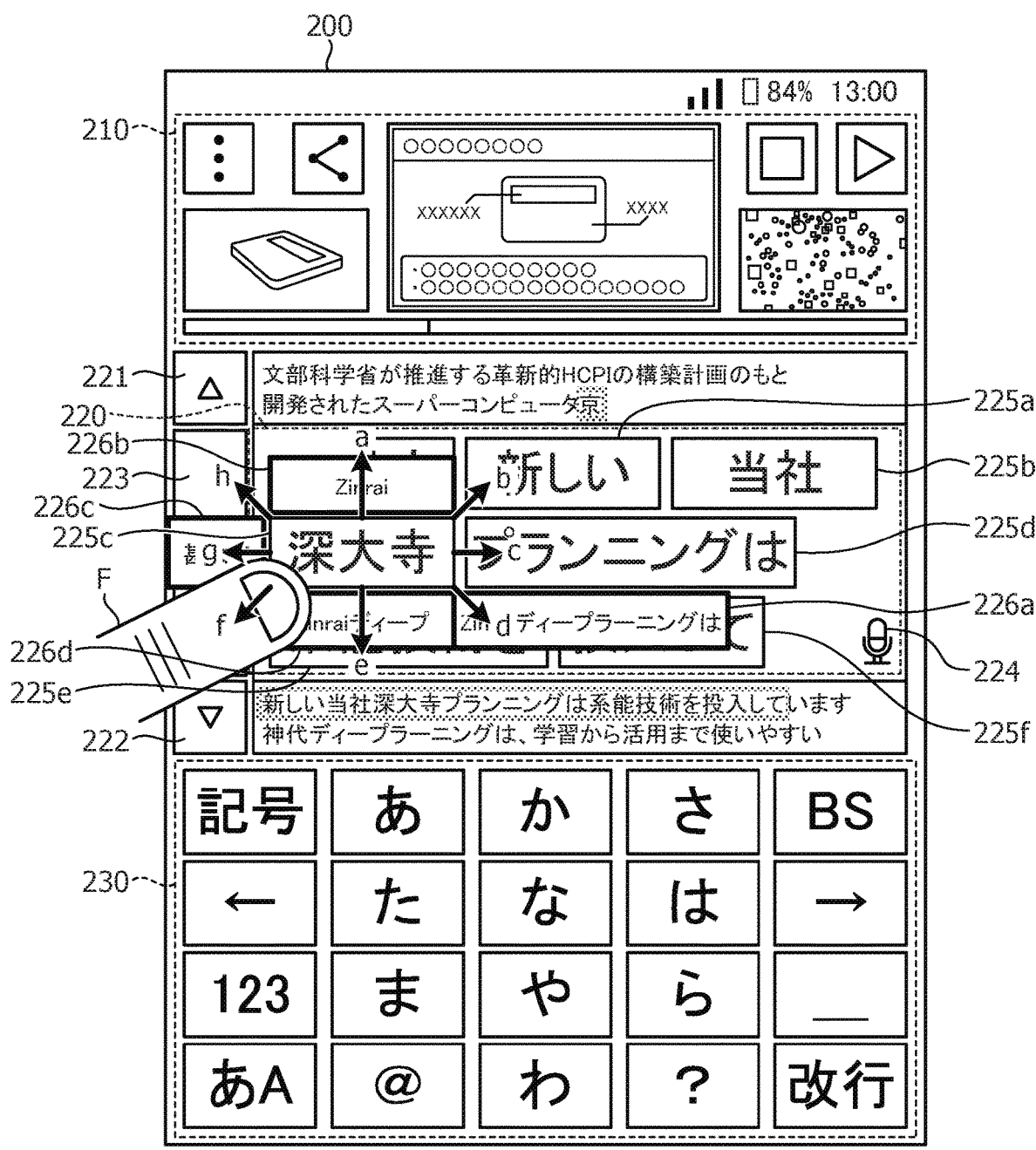
FIG. 9 is an explanatory diagram illustrating an example of an edit screen.

Although the examples of the screen for the right hand are illustrated in the edit screen 200 of FIGS. 4A, 4B, 5 to 6, the edit screen 200 may be a screen for the left hand. The display may be switched by the setting regarding the edit screen 200 for the right hand and the edit screen 200 for the left hands FIGS. 7 to 9 are explanatory diagrams illustrating examples of the edit screen 200, and for example, FIGS. 7 to 9 are diagrams illustrating the edit screen 200 for the left hand.

Figure 7:
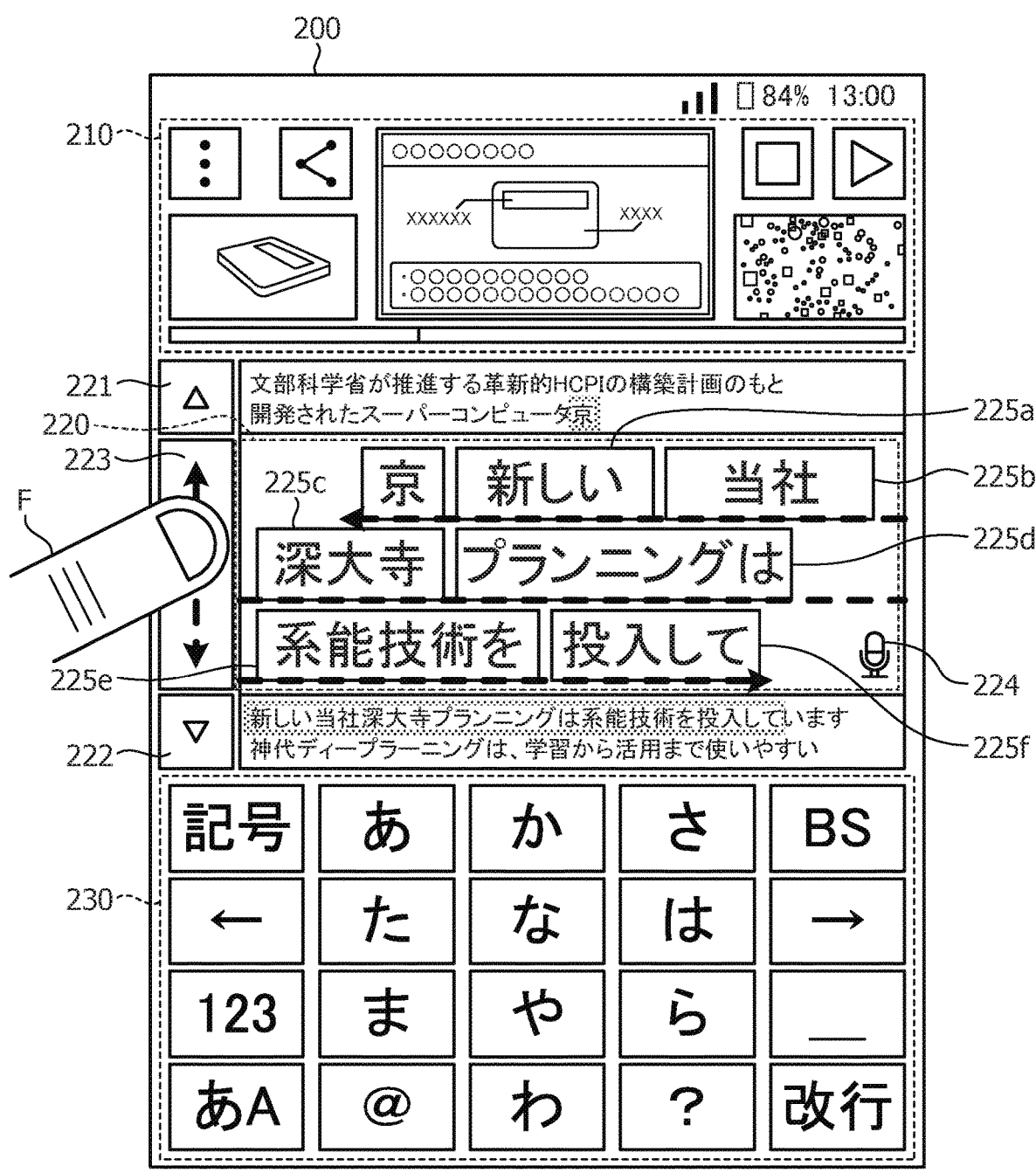
FIG. 7 is an explanatory diagram illustrating an example of an edit screen.

As illustrate in FIG. 7, the left side of the screen is the range of comfortable touch operation in the one-hand operation using the left hand on the edit screen 200 for the left hand, and the scroll bar 223 and the like are arranged on the left side. As illustrated in FIG. 8, the scroll bar 223 arranged on the left side of the screen may be operated to shift the word block 225 in the edit area 220. As illustrated in FIG. 9, the correction candidates 226a to 226c may be displayed around the word block 225c to be corrected at the left corner of the screen. In this case, the correction candidates 226 are displayed at positions avoiding the description direction (direction c) of the text around (directions a to h) the word block 225c to be corrected. As a result, the word block 225d after the word block 225c in the description direction may be easily checked without being hidden by the correction candidates 226.

In this way, the display control unit 136 of the information processing apparatus 100 generates the edit screen 200 of the text including the word blocks 225 generated, from the character string obtained by the speech recognition, by using the morphological analysis. The display control unit 136 displays the edit screen 200 on the terminal apparatus 10 in which the touch operation may be performed. The display control unit 136 shifts each of the word blocks 225 displayed on the edit screen 200 in the description direction of the text based on the scroll instruction when the display control unit 136 receives the scroll instruction for scrolling the text. As a result, when, for example, the one-hand operation of the terminal apparatus 10 is performed by the right hand, a given word block 225 may be shifted to the right side or the like of the screen that allows a comfortable touch operation, and the word block 225 may be easily corrected.

The scroll instruction is one of the forward operation and the back operation of the scroll bar 223 displayed on the edit screen 200. In the case of the forward operation, the display control unit 136 shifts each of the word blocks 225 in the forward direction of the description direction of the text in the edit screen 200. In the case of the back operation, the display control unit 136 shifts each of the word blocks 225 in the rewinding direction of the description direction of the text in the edit screen 200. As a result, the user may operate the scroll bar 223 to shift each of the word blocks 225 in the forward direction or the rewinding direction of the description direction of the text.

The display control unit 136 sets the word block 225 displayed at a given position (for example, upper right or upper left) of the edit screen 200 as the word block 225 to be corrected. As a result, when, for example, the one-hand operation of the terminal apparatus 10 is performed by the right hand, the word block 225 on the upper right of the edit screen 200 that allows the comfortable touch operation may be set as the word block to be corrected.

When the reception unit 133 of the information processing unit 100 receives speech input on the edit screen 200, the reception unit 133 sets the received speech input as a correction instruction regarding the word block 225 to be corrected. As a result, the speech input may be performed on the edit screen 200 to directly input the correction instruction regarding the word block 225 to be corrected. An operation, such as selecting the word block 225 to be corrected, may be excluded, and the input operation may be simply performed.

When the display control unit 136 displays the correction candidates 226 regarding the word block 225 around the word block 225 on the edit screen 200, the display control unit 136 displays the correction candidates 226 at positions avoiding the description direction (for example, directions c and g) of the text. As a result, the other word blocks 225 displayed in the description direction along with the word block 225 to be corrected using the correction candidates 226 may be easily checked on the edit screen 200 without being hidden by the correction candidates 226.

The display control unit 136 determines the position of the correction candidate 226 arranged around the word block 225 based on the number of characters of the correction candidate 226. For example, the display control unit 136 arranges the correction candidate 226 above or below the word block 225 or in a direction farther than the edge of the edit screen 200 when the number of characters of the correction candidate 226 is equal to or greater than a given number and a long width is required for the display. The display control unit 136 arranges the correction candidate 226 at a position closer to the edge of the edit screen 200 with respect to the word block 225 when the number of characters of the correction candidate 226 is equal to or smaller than a given number and a short width is required for the display. As a result, the information processing apparatus 100 may display each of the correction candidates 226 within the edit screen 200.

The constituent elements of the illustrated units may not be physically configured as in the drawings. For example, the specific mode of dispersion and integration of the units is not limited to the illustrated mode, and all or part of the units may be functionally or physically dispersed and integrated in arbitrary units according to various loads, status of use, and the like. For example, the presentation unit 135 and the display control unit 136 of the information processing unit 100 may be integrated. In addition, the illustrated processes are not limited to the order described above. The processes may be executed at the same time or may be executed after switching the order without making the processes inconsistent with each other.

All or arbitrary part of various processing functions of the apparatuses may be executed on a CPU (or microcomputer such as MPU and micro controller unit (MCU)). It is obvious that all or arbitrary part of various processing functions may be executed on a program analyzed and executed by a CPU (or microcomputer such as MPU and MCU) or on hardware based on wired logic.

Figure 10:
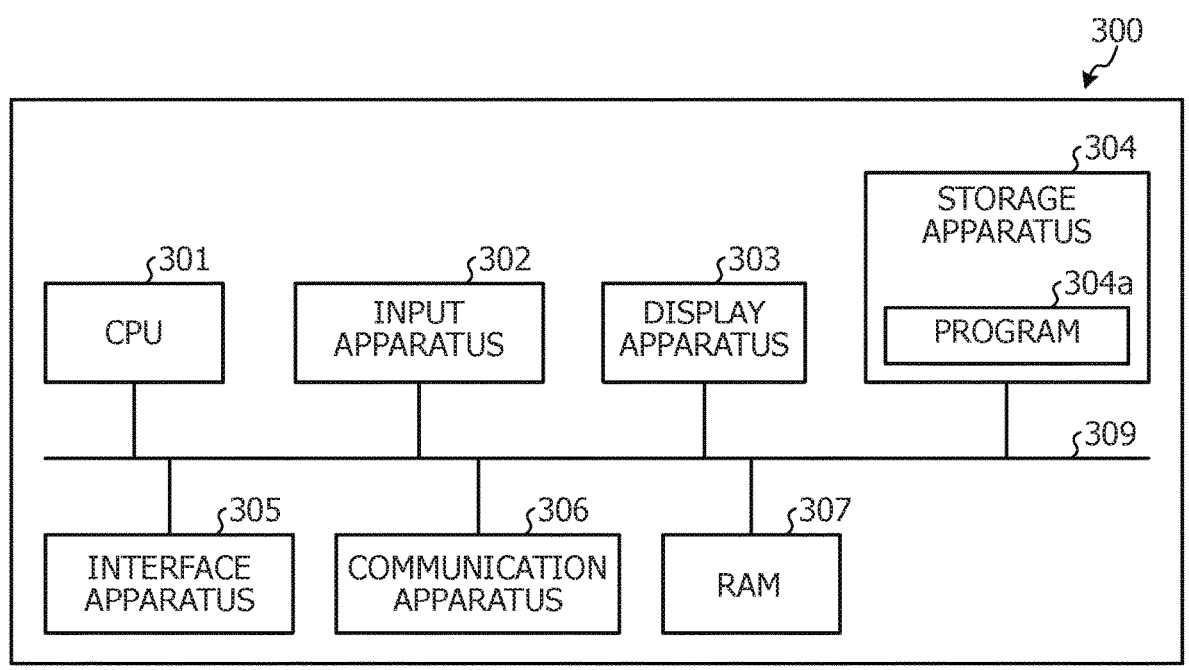
FIG. 10 is a block diagram illustrating an example of a computer that executes a program.

A computer may execute a prepared program to realize various processes described in the embodiments. Therefore, an example of the computer that executes the program with functions similar to the embodiments will be described. FIG. 10 depicts an example of the computer that executes the program.

As illustrated in FIG. 10, a computer 300 includes a CPU 301 that executes various types of arithmetic processing, an input apparatus 302 that receives data input, and a display apparatus 303. The computer 300 further includes a storage apparatus 304 that stores a program 304a and an interface apparatus 305 for coupling with various apparatuses. The program 304a is a program for executing various processes regarding the speech recognition units 131 and 132, the reception unit 133, the specification unit 134, the presentation unit 135, the display control unit 136, and the reproduction control unit 137 described in the embodiments. The program 304a is an example of the editing program.

The computer 300 further includes a communication apparatus 306 for wired or wireless coupling with the terminal apparatus 10 and other information processing apparatuses and a RAM 307 that temporarily stores various types of information. The components (301 to 307) of the computer 300 are coupled to a bus 309.

The CPU 301 reads the program 304a stored in the storage apparatus 304 and loads and executes the program 304a on the RAM 307 to execute various processes. As a result, the program 304a may cause the computer 300 to function as the speech recognition unit 131, the generation unit 132, the reception unit 133, the specification unit 134, the presentation unit 135, the display control unit 136, and the reproduction control unit 137 illustrated in FIG. 2.

The input apparatus 302 receives input of various types of information, such as operation information, from, for example, an administrator of the computer 300. The display apparatus 303 displays various screens, such as a display screen, to, for example, the administrator of the computer 300. A printing apparatus or the like is coupled to the interface apparatus 305. The communication apparatus 306 includes functions similar to, for example, the communication unit 110 illustrated in FIG. 2, and the communication apparatus 306 is coupled to the network N to exchange various types of information with the terminal apparatus 10 and other information processing apparatuses.

The program 304a may not be stored in the storage apparatus 304. For example, the computer 300 may read and execute the program 304a stored in a storage medium that may be read by the computer 300. Examples of the storage medium that may be read by the computer 300 include a portable recording medium, such as a CD-ROM, a digital versatile disc (DVD), and a universal serial bus (USB) memory, a semiconductor memory, such as a flash memory, and a hard disk drive. The program 304a may also be stored in apparatuses coupled to a public line, the Internet, a LAN, and the like, and the computer 300 may read the program 304a from the apparatuses to execute the program 304a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:
    displaying, on a terminal that enables a touch operation, an edit screen on which a text including word blocks is edited, the word blocks being generated by performing morphological analysis on a character string obtained by speech recognition; and
    upon reception of a scroll instruction to scroll the text, shifting each of the word blocks displayed on the edit screen in a description direction of the text, based on the scroll instruction.

2. The non-transitory, computer-readable recording medium of claim 1, wherein
    the scroll instruction is one of a first instruction indicating a forward operation of a scroll bar displayed on the edit screen and a second instruction indicating a back operation of the scroll bar, and
    the shifting includes:
    shifting each of the word blocks in a forward direction of the description direction of the text when the scroll instruction is the first instruction, and
    shifting each of the word blocks in a rewinding direction of the description direction of the text when the scroll instruction is the second instruction.

3. The non-transitory, computer-readable recording medium of claim 1, wherein the displaying includes setting one of the word blocks displayed at a given position of the edit screen as a target word block to be corrected.

4. The non-transitory, computer-readable recording medium of claim 3, wherein the process further comprises upon reception of speech input, setting the speech input as a correction instruction to correct the target word block.

5. The non-transitory, computer-readable recording medium of claim 1, wherein the displaying includes, upon reception of a selection instruction to select one of correction candidates for the target word block, displaying each of the correction candidates at a position avoiding the description direction of the text.

6. The non-transitory, computer-readable recording medium of claim 5, wherein the displaying includes determining the position based on a number of characters of each of the correction candidates.

7. A method performed by a computer, the method comprising:
    displaying, on a terminal that enables a touch operation, an edit screen on which a text including word blocks is edited, the word blocks being generated by performing morphological analysis on a character string obtained by speech recognition; and
    upon reception of a scroll instruction to scroll the text, shifting each of the word blocks displayed on the edit screen in a description direction of the text, based on the scroll instruction.

8. The method of claim 7, wherein:
    the scroll instruction is one of a first instruction indicating a forward operation of a scroll bar displayed on the edit screen and a second instruction indicating a back operation of the scroll bar; and
    the shifting includes:
    shifting each of the word blocks in a forward direction of the description direction of the text when the scroll instruction is the first instruction, and
    shifting each of the word blocks in a rewinding direction of the description direction of the text when the scroll instruction is the second instruction.

9. The method of claim 7, wherein the displaying includes setting one of the word blocks displayed at a given position of the edit screen as a target word block to be corrected.

10. The method of claim 9, wherein the process further comprises, upon reception of speech input, setting the speech input as a correction instruction to correct the target word block.

11. The method of claim 7, wherein the displaying includes, upon reception of a selection instruction to select one of correction candidates for the target word block, displaying each of the correction candidates at a position avoiding the description direction of the text.

12. The method of claim 11, wherein the displaying includes determining the position based on a number of characters of each of the correction candidates.

13. An apparatus comprising:
    a memory; and
    a processor coupled to the memory and configured to:
    display, on a terminal that enables a touch operation, an edit screen on which a text including word blocks is edited, the word blocks being generated by performing morphological analysis on a character string obtained by speech recognition; and
    upon reception of a scroll instruction to scroll the text, shift each of the word blocks displayed on the edit screen in a description direction of the text, based on the scroll instruction.

14. The apparatus of claim 13, wherein:
    the scroll instruction is one of a first instruction indicating a forward operation of a scroll bar displayed on the edit screen and a second instruction indicating a back operation of the scroll bar; and
    the processor is configured to:
    shift each of the word blocks in a forward direction of the description direction of the text when the scroll instruction is the first instruction, and
    shift each of the word blocks in a rewinding direction of the description direction of the text when the scroll instruction is the second instruction.

15. The apparatus of claim 13, wherein the processor is configured to set one of the word blocks displayed at a given position of the edit screen as a target word block to be corrected.

16. The apparatus of claim 15, wherein the processor is configured to, upon reception of speech input, set the speech input as a correction instruction to correct the target word block.

17. The apparatus of claim 13, wherein the processor is configured to, upon reception of a selection instruction to select one of correction candidates for the target word block, display each of the correction candidates at a position avoiding the description direction of the text.

18. The apparatus of claim 17, wherein the processor is configured to determine the position based on a number of characters of each of the correction candidates.

\* \* \* \* \*